UNITED STATES PATENT OFFICE.

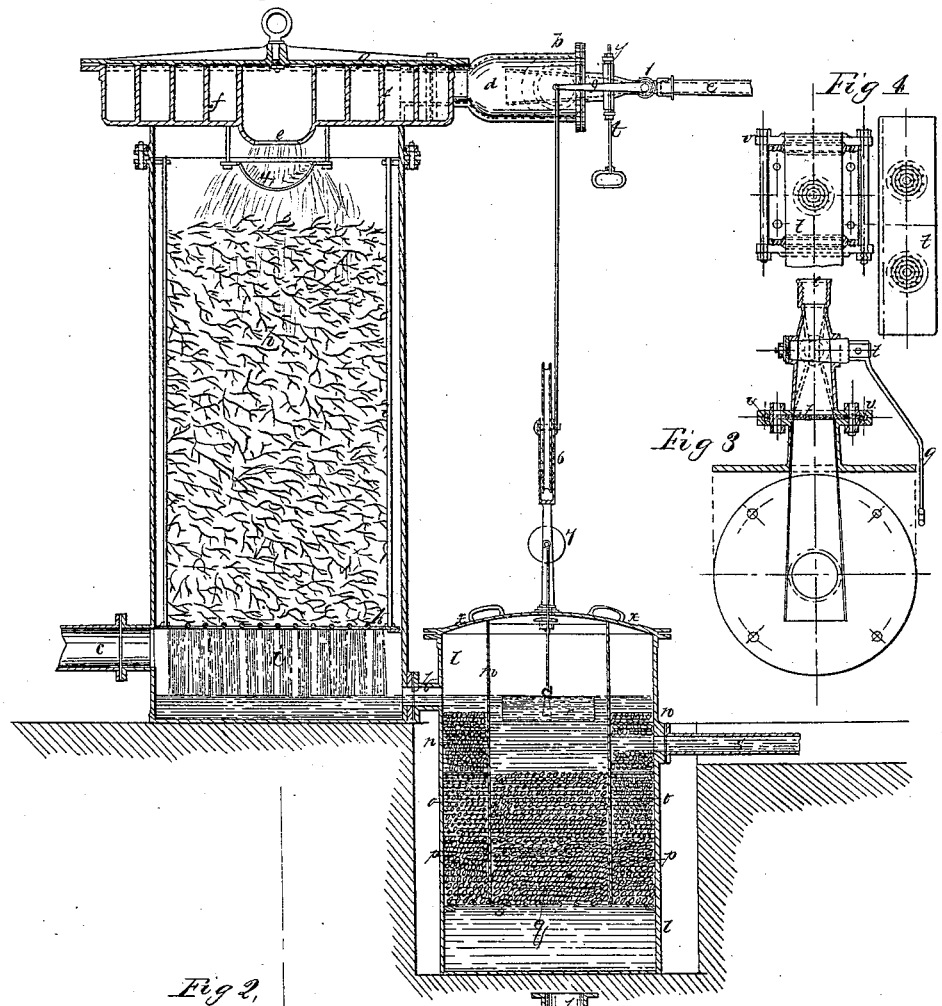

GUSTAVUS WEISSENBORN, OF NEW YORK, N. Y., ASSIGNOR TO EPES W. SARGENT.

THERMO-UDORIC FILTER.

Specification of Letters Patent No. 13,628, dated October 2, 1855.

*To all whom it may concern:*

Be it known that I, GUSTAVUS WEISSENBORN, of the city, county, and State of New York, have invented, made, and applied to use a certain new and useful Improvement in the Method of Purifying Water by Depositing the Mineral or other Matter in said Water; and I do hereby declare that the following is a full, clear, and exact description of the same, reference being had to the annexed drawing, representing an apparatus which may be used to receive the deposit of said mineral or other matter, wherein—
Figure 1, is a vertical section, Fig. 2, is a plan and Fig. 3, is a section plan of the supply cock in larger size.

Similar marks of reference indicate the same parts.
The nature of the said invention consists in the method of depositing mineral or other foreign matter from water as it trickles or runs over stones twigs brushwood, or other similar substances, by means of steam introduced into the vessel containing said stones twigs and similar substances, so as to heat the water and other contents of the vessel and cause said mineral or other matter to be deposited in consequence of the heat and extent of surface over which the water trickles or flows.

It is a well known property of water containing lime, magnesia or other impurities, that when heated to about the boiling point said substances will be deposited, hence the incrustation in steam boilers, kettles and other articles. Therefore my invention does not relate to this well known operation in itself; but it will be evident that whenever fire or other heat is applied outside any boiler or vessel containing water in which there is mineral matter to be deposited by the operation of the heat, that said mineral substance when deposited forms a partially non-conducting medium between the vessel and the water hence said vessels have to be cleaned out very often or the fire would burn out the metal of which they are composed besides requiring so much more fuel to keep up the heat. My invention therefore consists in introducing the water to be freed from mineral or other matter into a suitable vessel along with a supply of steam by which said water is heated to the required degree by direct contact, and the water is also showered into a mass of pebble stones birch twigs brush wood or other substances contained in said vessel, in which the mineral matter is deposited in consequence of the heat and the percolation or trickling of the water from one point to another in the mass, thus the apparatus is efficient until almost filled with a mass of the deposited mineral matter, and consequently requires cleaning but seldom, and the mass of mineral matter deposited does not obstruct the water from being heated, but on the contrary aids in so doing, for becoming heated itself by the steam in the vessel it imparts its heat to the water falling thereon.

In the annexed drawing an apparatus is represented which is, I believe, adapted in the best manner to accomplish the purpose hereinbefore set forth, although the construction of said apparatus may be varied to suit the particular circumstances so long as it acts in the manner herein set forth to effect a separation of impurities from water by the method described.

In the drawing $a$, is a vessel of suitable size, $b$, is a pipe leading steam into the same, either from a boiler or the exhaust steam from an engine, and $c$, is a pipe to a condenser or to the air, by which the surplus steam is passed from the apparatus. Water is admitted from a pipe $e$, in a regulated supply by means of the cock 1, and passes through a chamber $d$, and into the spiral or volute formed chamber $f$, the divisions in which cause the water and steam to flow around several times before they pass into the vessel $a$, at the center 2 of the chamber $f$. By this means the water is thoroughly heated by direct contact and commingling with the steam, and a portion of the impurities will be deposited in the chamber $f$, and to afford facility for cleaning this chamber the cover $g$ is made movable, being secured by flanches and bolts. From the opening 2, in the center of the chamber $f$, the water falls into a basis or deflector 4, and is thereby thrown over a mass $h$, of brushwood, stones, or any suitable substance and trickles down through the same, becoming still more heated, and leaving a deposit of the mineral or other matter on the said mass, and to allow the free passage of steam within the cylinder $a$. The mass of brush stones or other substances $h$, may be kept slightly away from the said cylinder or vessel *a*, by vertical bars *i′*, and the whole mass is to be supported on a grating *i*.

From the bottom of the vessel *a*, a pipe *k*, passes the water into a second cylinder or vessel *l*, fitted with a movable cover *x*, by which the same can be cleaned out.

5, is a grating supporting a second cylinder *m* within the cylinder *l*, and *s*, is a pipe to a pump or other place to which the purified water is to be conveyed. This pipe *s*, connects through the cylinder *l*, and takes the water from the cylinder *m*. Hence said water has to descend between the cylinders *l*, and *m*, pass through the grating 5, and ascend in said cylinder *m*. During its passage in this manner I make use of a second purifying operation, for between said cylinders *l*, and *m*, I pack small stones or pebbles (*n*, and *p*,) and introduce an intermediate layer of horse dung, charcoal or other suitable substance which will combine with any matter that may be held in solution in the water and render the same insoluble, so that such foreign matter will deposit among the pebbles (*p*) and fall on the bottom of the vessel *l*. Within the cylinder *m*, a mass of pebbles or similar substances *q*, prevent any sediment from passing up with the water, particularly when the apparatus is subjected to agitation as is the case in steamships.

*r*, is a float with a rod and a cord or chain over the pulley 6, to the balance weight 7, and 8, is a rod from one side of the pulley 6 to the arm 9 of the cock 1, by which the supply of water will be regulated according to the level of the liquid in the vessel *l*.

I make use of a strainer *l*, at the point *y*, to retain any solid matter that might impede the action of the apparatus. This is constructed as a plate *t*, with two sets of holes or strainers, which plate slides between suitable flanches, and is fitted with packings *u*, *u*, kept to the sides of said plate *t*, by clamps or followers *v*, *v*, screwed together. By this means if one strainer becomes clogged the plate *t*, can be shoved through so as to expose the obstructed strainer to be cleaned, while the other passes the water.

I do not make any claim to the well known result produced by heating water containing impurities or mineral substances to cause a deposit of the same, but I am not aware that impurities or mineral matters have ever before been separated from water by commingling the same with steam in a suitable apparatus, to heat the water and cause a deposit of the foreign matter it contains on twigs brushwood stones or other suitable substances in the manner and for the purposes hereinafter set forth. Therefore

What I claim and desire to secure by Letters Patent is—

The method herein set forth of separating impurities or mineral substances from water by so introducing steam and water into a suitable apparatus that they shall commingle and the water thereby be heated to fall in a shower upon, or be brought in contact with pebble stones twigs brushwood or other suitable substances or surfaces whereon said mineral matter or impurities will be deposited as substantially specified.

In witness whereof I have hereunto set my signature this twentieth day of August 1855.

GUSTAVUS WEISSENBORN.

Witnesses:
  LEMUEL W. SERRELL,
  THOMAS G. HAROLD.